2,889,874
Patented June 9, 1959

2,889,874

THERMAL TREATMENT OF FINELY DIVIDED SUBSTANCES

William H. Gauvin, Montreal, Quebec, Canada, assignor to Pulp and Paper Research Institute of Canada, Montreal, Quebec, Canada Application December 23, 1954, Serial No. 477,330

3 Claims. (Cl. 159—48)

The present invention relates to thermal physical change or separation or thermal chemical decomposition or chemical reaction of substances. The substances may be liquids, semi-solids or solids gasifiable by heat or separable by heat into components or decomposable by heat into products, at least one of which is gaseous such as steam, vapor, gases or mixtures thereof. Heat is transferred mainly by radiation to the substance in finely divided form while suspended or entrained and thus widely dispersed in the gaseous material evolved therefrom. The components or products including the evolved gaseous material may be separated and recovered by suitable means and heat may be recovered in useful form. An essential feature of the present invention resides in the supplying of the substance in a form wherein it is finely divided into units, such as finely atomized spray of liquid or a cloud of finely divided particles of semi-solid substances, to a chamber having a source of radiant heat therein for transfer to the droplets or particles. The gaseous material evolved from the substance will fill the chamber and flow toward an outlet, thus setting up a current in which the droplets or particles will remain suspended or entrained while continuing to be exposed to radiant heat. Separation or decomposition may thus be carried to the desired degree or to completion. In fact a whole sequence of separations or chemical reactions may be carried out on this current by causing it to pass through successive zones, the walls of which are maintained at suitable temperatures, and into which chemical reactants may, if desired, be introduced in gaseous or spray form. After such separation, decomposition, reaction, or sequence thereof, the evolved gaseous material and any residual droplets or particles may flow out of the chamber for separation, processing or utilization as may be appropriate and desirable.

In a very simple illustrative application of the present invention, the substance to be treated may comprise an aqueous solution of a heat stable compound which it is desired to concentrate or to dry to moisture-free condition. Such aqueous solution may be sprayed from a suitable nozzle in finely atomized form into a chamber having heated walls or other suitable source of radiant heat maintained at a temperature sufficient to vaporize water from each droplet. The evolved steam will constitute a moving atmosphere in which the residual droplets may remain suspended or entrained while exposed to radiant heat for a period of times sufficient to achieve desired concentration or to achieve complete evaporation of moisture from each droplet. The mixture of steam and concentrated droplets or residual dry particles may flow from the chamber into a separating device, for example a cyclone when dried particles remain, for separation of the dried particles from the steam. The steam may then be conducted to a condenser or to a heat exchanger.

In another simple illustrative application of this invention the material may constitute an aqueous solution of a substance which is not heat stable and which it is desired to subject to thermal decomposition. In such a case the radiantly heated chamber may be so constructed as to provide irradiation time sufficient for complete evaporation of moisture followed by exposure of the dried particles to radiant heat for a sufficient period to bring about desired decomposition. Any gaseous or vaporous substances produced by decomposition will become mixed with the steam. If solid particles remain they may be separated from the steam or mixture as described above. Heat values may be recovered from the steam and any non-condensible gases may be separated and recovered as desired.

Any process provided by the present invention may be carried out at or near atmospheric pressure in which event the evolved steam may be condensed or utilized in any manner appropriate for waste steam. However, a particular advantage of the present invention lies in the fact that it may be carried out at a super-atmospheric pressure whereby to produce useful process steam, perhaps through a steam converter.

The superiority of the present invention resides first of all in increasing the speed of evaporation, drying, pyrolysis and other processes in general, through taking maximum advantage of the increase in transfer area resulting from fine subdivision and dispersion of the particles without introducing a film of foreign gas surrounding each particle as inevitably occurs in normal spray drying. Such film of foreign gas would offer substantial resistance to the exchange of heat and matter in the process of the present invention where heat is introduced primarily by radiation. An additional advantage is found in increased speed of reaction (e.g., of pyrolysis) subsequent to evaporation in the apparatus itself, due perhaps to increase in effective surface area of the particles as a result of the extraordinary conditions of evaporation. For example, in the case of one substance, the evaporation plus pyrolysis time in this apparatus was found to be six seconds, as against twenty minutes for pyrolysis alone in conventional fluidizing apparatus—an acceleration of some 200-fold. Another advantage of the present invention lies in its application to industrial wastes which frequently are quite highly dilute and may be corrosive or may produce sticky masses or scale when partially concentrated. The evaporation of water from such wastes in the multiple-effect evaporators or the convected heat spray dryers ordinarily used is often uneconomical and difficult. In the former particularly, corrosive materials or sticky residues raise severe equipment problems, while in the latter very little of the heat required in evaporation is recoverable. In contrast the present invention can produce useful steam, unmixed with large quantities of drying gas, from highly dilute substances and complete evaporation or heat decomposition may be effected while the material is suspended or entrained in its own gaseous or vaporous atmosphere. Corrosive materials are thus substantially kept out of contact with equipment walls or surfaces until such time as they are dried or decomposed to relatively innocuous form. Also, materials which are sticky when partially dried or which tend to form scale are kept out of contact with walls or surfaces upon which they might accumulate until such time as they are completely dried or decomposed.

While aqueous solutions are used as illustrative examples herein it will be understood that solutions, suspensions or slurries of aqueous or non-aqueous type may be equally well handled by employing nozzles or spray-forming equipment of suitable type. Also the material may be supplied to the radiantly heated chamber in the form of finely divided solid or semi-solid particles by the use of suitable dispersing equipment capable of forming a cloud of such particles.

It is an object of the present invention, therefore, to provide an improved process for thermally separating and/or thermally decomposing and/or chemically reacting finely divided substances by radiant heat, and further to combine such process with physical and/or chemical separation of the components and with provision for the recovery of heat values in readily useable form.

Referring now to the drawings, there are shown in somewhat diagrammatic fashion preferred but not necessarily the only forms of the present invention.

Figure 1:
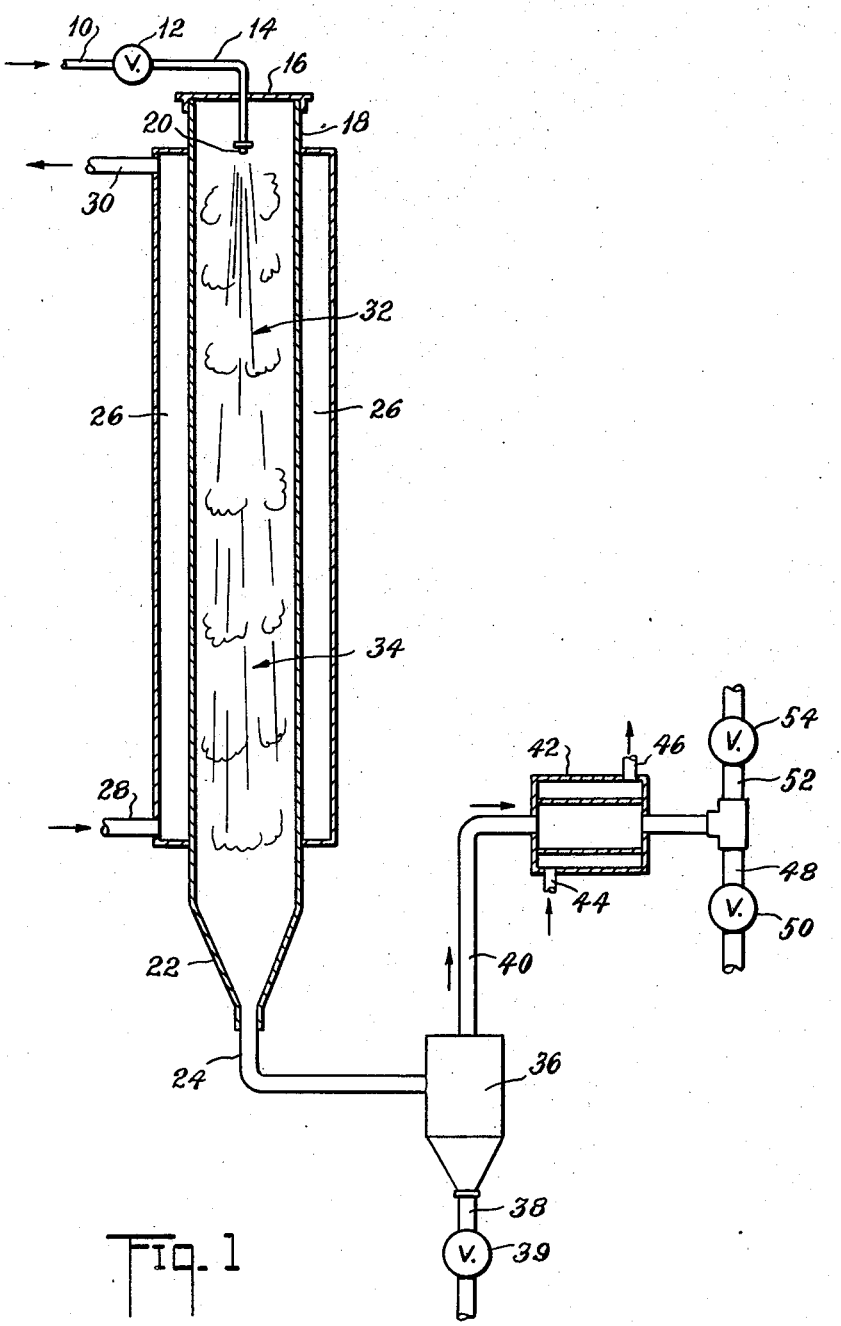
Fig. 1 is a diagrammatic illustration of apparatus suitable for carrying out several embodiments of the present invention.

Referring now to Fig. 1, a liquid comprising a volatile fraction such as water having dissolved, dispersed or suspended therein a less volatile or non-volatile substance is supplied under hydrostatic pressure to a line 10. The line 10 may be equipped with a shut-off valve 12 and be connected with a line 14 extending through a top closure 16 of a chamber 18. The line 14 terminates near the upper zone of the chamber 18 and is provided with a nozzle 20 of suitable design for forming a finely divided or atomized spray of the particular liquid being supplied to the line 10. Preferably the nozzle 20 is so designed that the liquid particles will not be propelled thereby into contact with the chamber wall. The chamber 18 may be cylindrical in cross section and tapered at 22 toward its lower end to communicate with an outlet line 24.

The chamber 18 may be constructed of metal or other material having suitable characteristics for the particular liquid being supplied to the nozzle 20. Radiant heating means are provided within the chamber. For example, the walls of the cylinder 18 may be heated in any suitable manner to a temperature appropriate for the evaporation of the volatile fraction of the liquid emerging from the nozzle 20. The axial length of the chamber 18 must be great enough, having regard for the diameter or cross section thereof and the speed with which a particle passes therethrough, to provide sufficient time for the evaporation of a desired amount of the volatile fraction in each particle at the temperature provided. Thus, the chamber 18 may have surrounding it a jacket 26 of appropriate axial and cross-sectional dimensions and having an inlet opening 28 and an outlet opening 30. A fluid heating medium such as hot gas, for example, may be conducted into the jacket 26 through the inlet 28 and may emerge through the outlet 30. If the liquid emerging from the nozzle 20 is an aqueous liquid the walls of the chamber 18 will be maintained at a temperature exceeding and preferably substantially exceeding the saturation temperature at the pressure used whereby heat will be transferred by radiation to the finely divided particles of liquid within the chamber 18. Since the chamber 18 is closed at the top, except for the entry of the liquid inlet line 14, the steam or vapor thus produced can escape from the chamber only by moving toward the outlet line 24. The moving body of vapor will entrain the particles or droplets and carry them toward the outlet 24 while they continue to be exposed to radiant heat. The residual particles will flow with the steam or other vapor outwardly through the outlet 24. The emerging mixture of particles or concentrated droplets and vapor may be separated or otherwise processed in any suitable manner.

Alternatively, the finely divided material supplied to the upper zone of the chamber 18 may comprise a solid or semi-solid containing a substantial amount of volatile liquid which it is desired to remove either partially or wholly by evaporation. For example, the material may comprise finely divided bark from logs supplied to a pulp mill. In such event it might be desired to evaporate all of the water contained in such bark or it might be desired to reduce the water content to such an extent as to render it readily usable as a fuel. The finely divided solid material may be supplied by suitable feeding means to a distributor of suitable design which is substituted for the nozzle 20 shown in Fig. 1. Such distributor may be mechanical or may operate under relatively high gaseous pressure, it being understood that the particular construction thereof will be appropriate for the particular material and does not form a specific part of the present invention. The function of the distributor is to form a cloud of appropriate density of the finely divided solid particles which will flow through the chamber 18 to be exposed to the radiant heat supplied therein. The dried or partially dried particles together with the steam or other vapor resulting from evaporation of the volatile liquid will emerge from the chamber 18 through the line 24 and may be separated and further processed in any suitable manner.

Apparatus for separating the vapor and concentrated or solid phases of the mixture emerging from the line 24 may comprise a gas-liquid or a gas-solid separator. An illustrative gas-solid separator may comprise a conventional cyclone 36 having a discharge opening 38 and valve 39 at the bottom thereof for the solids or particles and a line 40 emerging from the top for carrying away the vapor or gaseous fraction of such mixture. In a simple operation wherein, for example, an aqueous solution of some relatively heat-stable material is sprayed into the chamber 18 the mixture emerging from the line 24 into the cyclone 36 will comprise steam and particles of dried or partially dried material. The particles may be collected at the outlet 38 and the steam may be conducted through line 40 to any heat-recovery or pressure controlling apparatus which might be deemed to be desirable.

Illustrative apparatus is also shown in Fig. 1 for recovering heat values from the vapors or gases flowing through the line 40 from the separator 36. Thus, heat exchanger 42 having an inlet 44 for a fluid to be heated and an outlet 46 from which the heated fluid may be conducted to some point of use. The condensible portion of the gases flowing from the line 40 will condense within the heat exchanger 42 and may be withdrawn through a line 48 and valve 50 while the noncondensible portions thereof will continue to flow through a line 52. In a simple operation at or near atmospheric pressure wherein the gaseous material flowing through the line 40 consists substantially entirely of steam, the line 52 may discharge directly to the atmosphere. In other instances wherein some useful gases may be mixed with the steam in line 40, the line 52 may be conducted to suitable storage or processing apparatus for such useful gases.

In any operation embodying the present invention, the chamber 18 may be maintained under super-atmospheric pressure. To this end the line 52 may be provided with a valve 54 which is of a suitable pressure regulating type to maintain a desired super-atmospheric back-pressure within the lines 52 and 40 and the cyclone 36 and chamber 18. In such event the valve 39 through which solids are unloaded from the cyclone 36 and the valve 50 through which condensate is removed from the condenser 42 also should be of suitable pressure regulating or pressure maintaining type. The steam formed as a result of evaporation of moisture or the vapors formed as a result of the evaporation of other types of volatile liquid will thus be formed at a super-atmospheric pressure within the chamber 18 and heat values may be recovered in the heat exchanger 42. The steam or other condensible vapors will condense within the heat exchanger 42 transferring heat to a fluid introduced in the inlet 44 and exhausted from the outlet 46 of the heat exchanger. Condensed liquids may be withdrawn through the line 48 and valve 50 while any uncondensed gases may escape through the pressure regulating valve 54. If such gases include useful gases they may be conducted to such processing or storage equipment as may be desirable.

In addition to thermal separation such as concentration or drying of finely divided materials the apparatus of Fig. 1 may be used for thermal decomposition of finely divided materials, for example the production of carbon from suitably finely divided materials of carbonaceous type. The products of such decomposition or pyrolysis will comprise solids and gases which will flow with steam from the chamber 18 through the discharge line 24. The axial length of chamber 18 and the temperature applied to the walls of chamber 18 will be so selected, for example, that the material emerging from the nozzle 20 or the solids distributor substituted therefor, will have the volatile liquid portions thereof substantially evaporated within the zone indicated at 32 after which the dried particles will continue to flow through the zone indicated at 34 while still exposed to radiant heat at such temperature as to cause desired heat treatment such as decomposition or pyrolysis. The steam formed in the zone 32 will move through the zone 34 to join with any gaseous products of decomposition or pyrolysis and eventually to flow out of the chamber 18 through the discharge line 24. The solids may be separated from the mixture in the cyclone 36 while the mixture of steam and gas will flow through the line 40 and into the heat exchanger 42. The steam or other condensible vapors will condense in the element 42, the condensate being withdrawn through line 48 and valve 50 while the gas remaining will flow through the line 52 and valve 54. When the gaseous products of decomposition or pyrolysis are combustible or otherwise useful they may be conducted to suitable storage apparatus or apparatus for utilibation or processing thereof. The operation just described may be carried out at atmospheric or superatmospheric pressure as may be appropriate or desirable in the light of the above disclosure. Under these conditions, the heat exchanger 42 may be replaced if desirable by a steam converter, for the generation of clean process steam.

The chamber 18, shown in Fig. 1, may be disposed vertically as illustrated or at any angle of inclination. The rate of movement of finely divided droplets or particles through the chamber is almost entirely established by the flow of evolved gaseous material which may comprise steam, vapors or gases or mixtures thereof although such rate will be slightly higher in a vertically disposed chamber.

Figure 2:
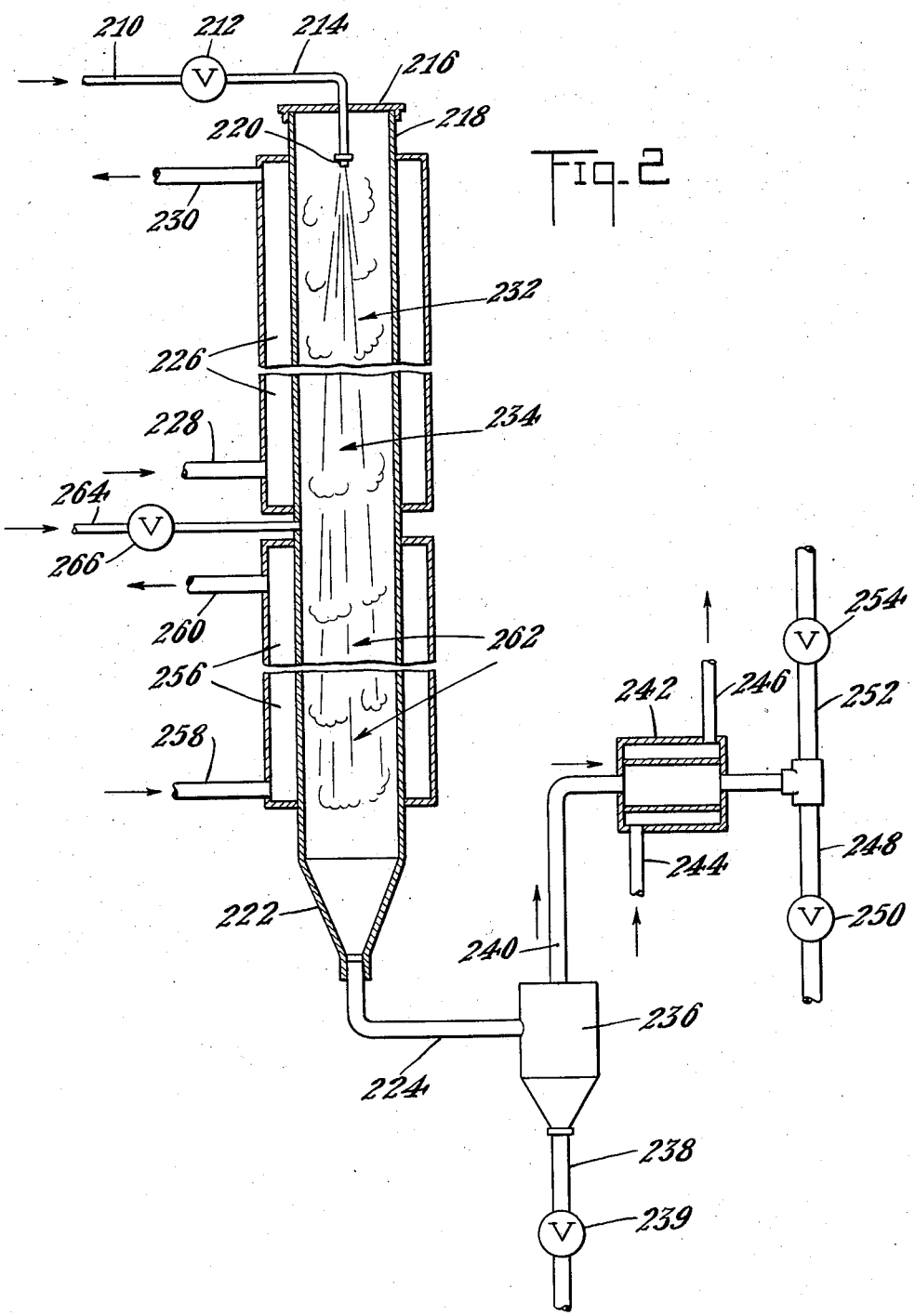
Fig. 2 is a view similar to Fig. 1, showing apparatus for carrying out still further embodiments of the present invention.

In Fig. 2 there is diagrammatically illustrated a still further modification of the present invention wherein different or further thermal separation, decomposition or chemical reaction may be carried out on finely divided materials. In said Fig. 2 the elements identified by the reference numerals 210 through 254 may correspond with the elements identified by the reference numerals 10 through 54 in Fig. 1 and description thereof will not be repeated. The chamber 218 is illustratively provided with a heating jacket 256 located below the jacket 226 and provided with inlet and outlet lines 258 and 260, respectively, for a suitable heated fluid. The jacket 256 may be maintained at a suitable elevated temperature different from or the same as the jacket 226 to subject the finely divided material within a zone 262 to radiant heat of desired degree. Thus, finely divided material which has been subjected to radiant heat within the zones 232 and/or 234 to bring about any of the results discussed above may then pass to the zone 262 wherein further or different degrees of irradiation may occur. The material leaving the zone 262 will reach the lower portion 222 of the chamber 218 and from there may be conducted through separating and/or heat recovering apparatus all as disclosed hereinabove in connection with Fig. 1.

The apparatus shown in Fig. 2 may also be used to bring about further chemical reaction with the finely divided material exposed to radiant heat within the zone 262. Thus a line 264 having a valve 266 may be provided for the introduction, when desired, of a reactant such as a reactant gas which is brought into contact with the finely divided material as it passes through the zone 262. For example, a finely divided material which has been dried or otherwise treated in the zones 232 and 234 at a predetermined temperature may be mixed with a reactant gas such as air introduced through the line 264 and thereupon exposed to a radiant heat within the zone 262 wherein a reaction such as calcination occurs.

The apparatus diagrammatically shown in Fig. 2 is merely illustrative and it will be understood that a plurality of inlets such as the line 264 may be provided at suitable levels for the introduction of further reactant to replenish the reactant introduced at line 264 or for the introduction of other reactants to cause different reactions in successive zones of the chamber 218. Similarly, additional means may be provided for supplying radiant heat at several different temperatures within several successive zones of the chamber 218. Thus additional jackets like the jacket 256 may be provided in instances where several successive zones for applying the same or different degrees of radiant heat to the finely divided material are desired. Also, physical separation may be followed by introduction of one or more reactants or further reactants to a separated fraction which is thereafter subjected to radiant heat in a similar zone or zones. For example, the gas leaving the cyclone 236 may be subjected to further reaction and heating in one or more such zones. Thus any desired sequence of separations and reactions may be carried out on finely divided and/or gaseous materials in a succession of zones.

In view of the fact that the gaseous material evolved from substances which are thermally treated in accordance with the present invention may be components of the original substance (for example steam) or may be products of thermal decomposition thereof (for example a combustible gas), the claims herein are intended to include all such components or products or mixtures thereof within the expression "gaseous material." Also in said claims the term "particles" as applied to the non-gaseous residue is intended to include such residue whether it be in the form of concentrated droplets, or dried solid particles, or whether it constitutes reaction products or the residue of thermal separation or reaction. The term "finely divided" which is used in at least some of the claims is intended to cover all practical sizes of units into which a substance may be divided, such as sprayed liquids in droplet form or powdered or otherwise comminuted solids or semi-solids. For any given substance the smaller the droplets or particles are the lower their terminal velocity will be. Thus, in a vertical chamber of given length the more finely divided material will fall somewhat more slowly and thus more nearly progress at the velocity of the moving atmosphere in which they are entrained. In a horizontal or inclined chamber wherein gravity affects the material in a direction transverse to the flow of evolved gaseous material the more finely divided material will permit the use of a chamber having a greater length-to-diameter ratio while avoiding deposit of particles on the lower wall. Probably more important than the factors just discussed with respect to "finely divided" is the fact that the more finely a given material is divided the more rapidly liquids may be evaporated therefrom, the more rapidly a particular temperature may be reached under otherwise identical conditions of radiant heat transfer, and the more rapidly the particle will react chemically, due to its greater ratio of surface area to mass. Thus, dividing the substance to be treated as finely as practicable while maintaining an adequate supply can be expected to yield generally favorable results as regards the size, design and heat economy of equipment needed for processing given quantities of the substance to be treated.

In certain of the claims reference will be made to entrainment of finely divided substances in an atmosphere consisting essentially of gaseous material evolved from the substance as a result of thermal treatment of such substance. It will be understood that references of this general type are intended to cover operations wherein the atmosphere within the chamber includes incidental or additional gaseous materials. For example air or other gaseous material may be used in forming a spray of liquid substances or in distributing a cloud of finely divided solids or semi-solids in any form of the invention.

I claim:

1. The method of uniformly thermally treating a substance of the type which is non-gaseous at normal atmospheric temperature and which has at least a fraction which evolves gaseous material at an elevated temperature which comprises: dividing said substance into small particles; continuously supplying and dispersing said particles into one end of a radiantly heated zone; elevating the temperature of said particles, by passing them through said zone, at least to a temperature at which said substance evolves gaseous material and maintaining said temperature throughout the passage of said substance through said zone to thermally treat said substance; continuously removing all of said thermally treated substance from the other end of said zone; and regulating the rate of supply of said substance to said zone, the temperature to which said substance is elevated in said zone and the rate of removal of said thermally treated substance from said zone to cause continuous evolution from said substance in said zone of said gaseous material at a volumetric rate at least sufficient by itself to cause a constant flow of said gaseous material in a substantially rectilinear path from said one end of said zone through the remainder of said zone to said other end of said zone at a speed sufficient to entrain said particles in said evolved gaseous material and carry each of such entrained particles through said zone at a speed substantially equal to the speed of said evolved gaseous material.

2. The process of claim 1 wherein the thermally treated substance removed from said radiantly heated zone comprises a stream of said evolved gaseous material having residual particles entrained therein.

3. The process of claim 1 wherein the thermally treated substance removed from said radiantly heated zone comprises a stream of said evolved gaseous material having residual particles entrained therein and wherein said stream with said residual particles entrained therein is passed through a second radiantly heated zone.

References Cited in the file of this patent

UNITED STATES PATENTS

| | | |
|---|---|---|
| 888,016 | Just | May 19, 1908 |
| 888,017 | Just | May 19, 1908 |
| 1,163,339 | Hauss | Dec. 7, 1915 |
| 1,213,596 | De Baufre | Jan. 23, 1917 |
| 1,215,889 | Stutzke | Feb. 13, 1917 |
| 1,634,640 | Zinzinia | July 5, 1927 |
| 1,713,237 | Morin | May 14, 1929 |
| 1,782,054 | Uhl | Nov. 18, 1930 |
| 2,155,119 | Ebner | Apr. 18, 1939 |
| 2,283,832 | Thomas | May 19, 1942 |
| 2,397,899 | Witkiewicz | Apr. 2, 1946 |
| 2,413,420 | Stephanoff | Dec. 31, 1946 |
| 2,460,546 | Stephanoff | Feb. 1, 1949 |
| 2,465,410 | White | Mar. 29, 1949 |
| 2,473,539 | Merriam | June 21, 1949 |
| 2,576,264 | Coulter et al. | Nov. 27, 1951 |
| 2,636,555 | Klepetko et al. | Apr. 28, 1953 |

FOREIGN PATENTS

| | | |
|---|---|---|
| 977,742 | France | Apr. 4, 1951 |